United States Patent [19]

Tamburini et al.

[11] Patent Number: 5,216,844
[45] Date of Patent: Jun. 8, 1993

[54] PROCESS FOR THE AUTOMATIC MACHINING OF EDGES OF GLASS PLATES AND APPARATUS FOR CARRYING OUT SAID PROCESS

[75] Inventors: Marco Tamburini; Luciano Paci; Giancarlo Selci, all of Pesaro, Italy

[73] Assignee: Intermac S.r.l., Pesaro, Italy

[21] Appl. No.: 769,700

[22] Filed: Oct. 2, 1991

[30] Foreign Application Priority Data

Oct. 5, 1990 [IT] Italy ................................ 3677 A/90

[51] Int. Cl.$^5$ .............................................. B24B 9/10
[52] U.S. Cl. .............................. 51/165.72; 51/283 E; 51/165.71; 51/165.87
[58] Field of Search ............ 51/283 E, 165.71, 176.87, 51/165.72, 165.8, 168

[56] References Cited

U.S. PATENT DOCUMENTS

| 4,519,167 | 5/1985 | Halberschmidt et al. ........ 51/283 E |
| 4,633,408 | 12/1986 | Reinmold et al. ................ 51/283 E |

FOREIGN PATENT DOCUMENTS

| 0092091 | 10/1983 | European Pat. Off. . |
| 0145007 | 6/1985 | European Pat. Off. . |
| 0155218 | 9/1985 | European Pat. Off. . |
| 0377755 | 7/1990 | European Pat. Off. . |
| 3502631 | 10/1985 | Fed. Rep. of Germany . |
| 3532903 | 3/1987 | Fed. Rep. of Germany ........ 51/168 |
| 2476057 | 8/1981 | France .............................. 51/283 B |
| 1556443 | 4/1980 | United Kingdom . |

Primary Examiner—Robert A. Rose
Attorney, Agent, or Firm—Guido Modiano; Albert Josif

[57] ABSTRACT

The process for the automatic machining of edges of glass plates includes the steps of:

fixing the glass plate onto a work table;

storing a set of space coordinates along two orthogonal axes X and Y of the edge of the plate to be machined, the coordinates being either detected by means of successive sequences of self-learning movements of a probe along the edge of the plate or being set on a keyboard;

processing the coordinates in order to determine the path to be followed by the contour of a grinder in order to produce a contour which is constituted by mutually tangent arcs and straight lines;

calculating the successive movements along the axes X and Y which the center of the grinder must perform in order to machine the edge of the plate according to the diameter and/or wear of the grinder being used;

controlling, according to the calculated values, the movements of a grinder-supporting machining head along the edge of the plate;

actuating the head so as to remove in succession, from a tool magazine, the self-learning probe and/or increasingly finer diamondized polishing grinders in order to produce, by successive passes, the polished edge on the edge of the plate.

16 Claims, 4 Drawing Sheets

PROCESS FOR THE AUTOMATIC MACHINING OF EDGES OF GLASS PLATES AND APPARATUS FOR CARRYING OUT SAID PROCESS

BACKGROUND OF THE INVENTION

The present invention relates to a process for the automatic machining of edges of glass plates and to an apparatus for carrying out said process.

The edges of glass plates ar usually subjected to a process known as "polished-edge machining", which consists in performing in succession various passes with increasingly finer grinders along the edge of the plate while keeping the abrasion region wet with water said grinders operate with their axis orthogonal to the plane of the plate to be machined.

The polished edge machining is currently performed with semiautomatic processes, using apparatuses constituted by a central support with a sucker-fitted table, on which the plate to be machined is fixed, and by a grinder supporting arm which can be turned all around the plate and along which a grinder supporting head can be moved radially; the operator grips the head with his hands and, while keeping it pressed against the plate, moves it tangentially all around said plate, in order to machine its edge; these apparatuses are sometimes equipped with electronic devices and, by using a template, allow to semiautomatically machine parts having a simple contour.

This method is generally time consuming and requires expert operators who can optimally measure the pressing effort against the edge of the plate so as to avoid damaging it and also avoid removing excess material; besides, if it is necessary to produce a series of identical parts, said parts will usually be slightly different from one another according to the skill of the operator.

SUMMARY OF THE INVENTION

The technical aim of the present invention is to obviate the above described disadvantages, i.e. to provide an automatic apparatus which performs polished-edge machining on glass plates having any contour, without requiring expert operators and ensuring that, in case of batch machinings, all the finished plates are identical.

This aim is achieved by the present process for the automatic polished-edge machining of the edge of glass plates having any shape, characterized in that it comprises the steps of: fixing the glass plate onto a work table; storing a set of space coordinates along two orthogonal axes X and Y of the edge of the plate to be machined, said coordinates being either detected by means of successive sequences of self-learning movements of a probe along the edge of the plate or being set on a keyboard; processing said coordinates in order to determine the path to be followed by the contour of a grinder in order to produce a contour which is constituted by arcs and straight lines tangent thereto; calculating the successive movements along the axes X and Y which the center of the grinder must perform in order to machine the edge of the plate according to the diameter and/or wear of the grinder being used; controlling, by means of said calculated values, the movements of a grinder-supporting machining head along the edge of the plate; actuating said head so as to remove in succession, from a tool magazine, said self-learning probe and/or increasingly finer diamondized polishing grinders in order to produce, by means of successive passes, the polished edge on the edge of the plate.

The apparatus for carrying out the process is characterized in that it comprises a substantially horizontal work table which is provided with fixing and centering means for at least one glass plate and on which a beam is fixed, a carriage being actuated along said beam so as to be movable along two axes X, Y which correspond to the directions of the length and width of said table, said carriage bearing vertical guides along which a slider is mounted and is actuated so as to be movable vertically along an axis Z, said slider bearing a machining tool supporting head, said machining head comprising a grinder supporting mandrel with a vertical axis, a tool magazine for a plurality of grinders and for a probe, said apparatus further comprising a computer which is suitable for storing the coordinates of the contour of the edge of the plate to be machined and for controlling the movements of the tool supporting head in order to detect the contour with the probe and/or to actuate the grinding of the edge with increasingly finer grinders.

BRIEF DESCRIPTION OF THE DRAWINGS

Further peculiarities will become apparent and evident from the detailed description of a preferred but not exclusive embodiment of a process and of an apparatus according to the invention, illustrated only by way of non-limitative example in the accompanying drawings, wherein.

DESCRIPTION OF THE PREFERRED EMBODIMENTS

Figure 1:
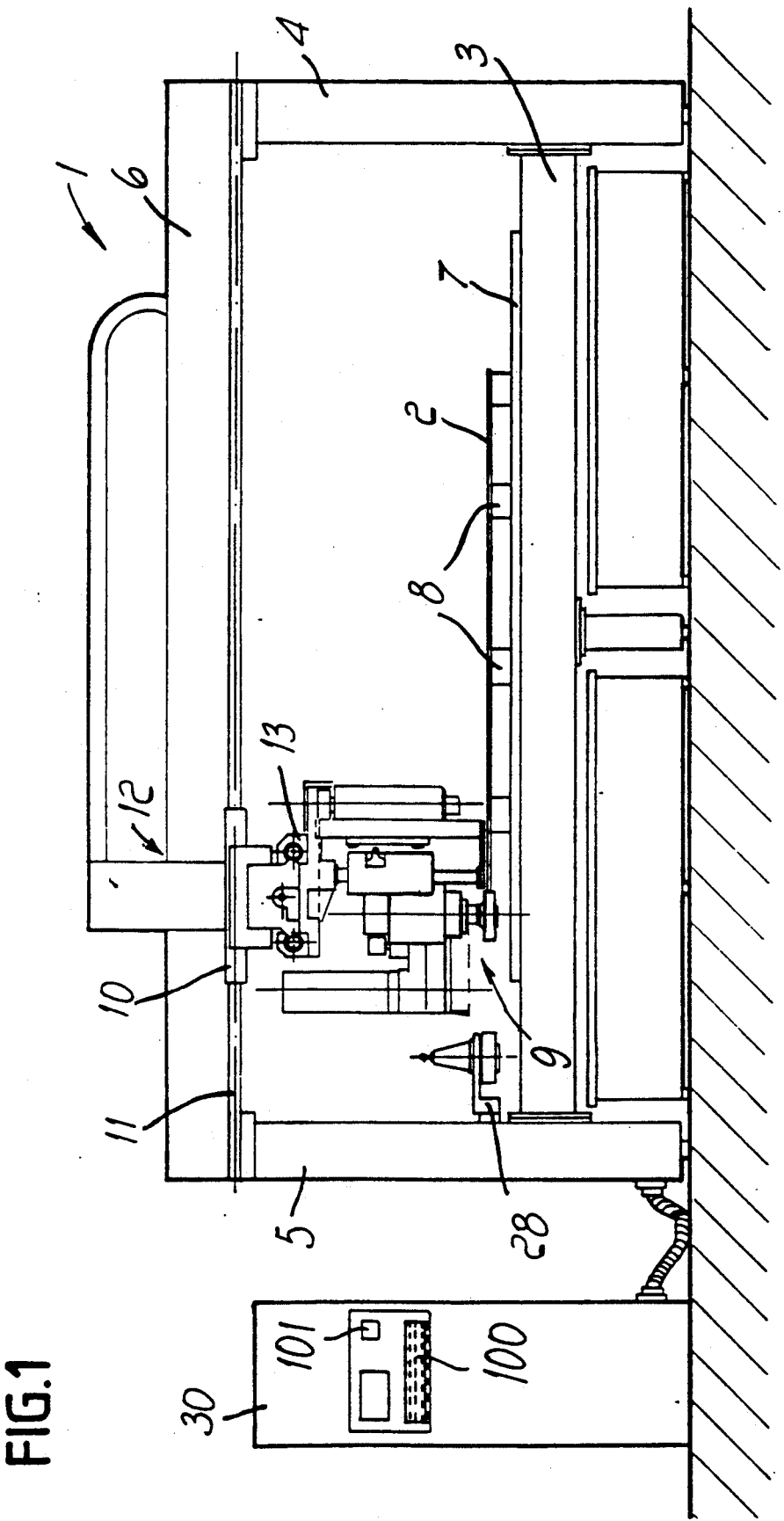
FIG. 1 is a schematic elevation view of the apparatus according to the invention.
Figure 2:
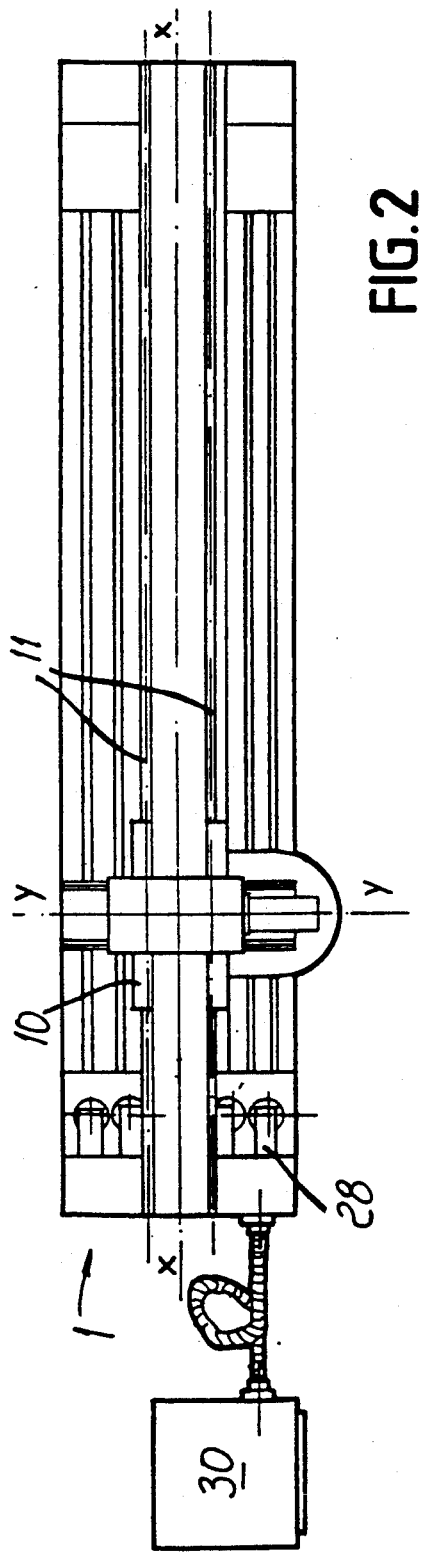
FIG. 2 is a schematic plan view of the apparatus of FIG. 1.

With particular reference to the above figures, the reference numeral 1 generally indicates the apparatus for carrying out the polished edge machining according to the invention.

Figure 4:
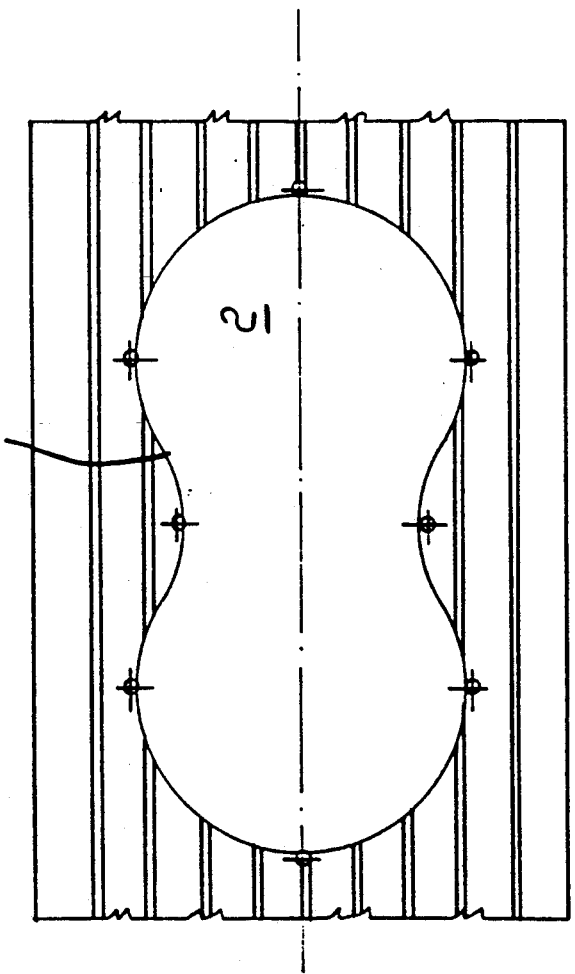
FIG. 4 is a schematic plan view of the table of FIG. 1 with a glass plate, during various steps of self-learning.
Figure 3:
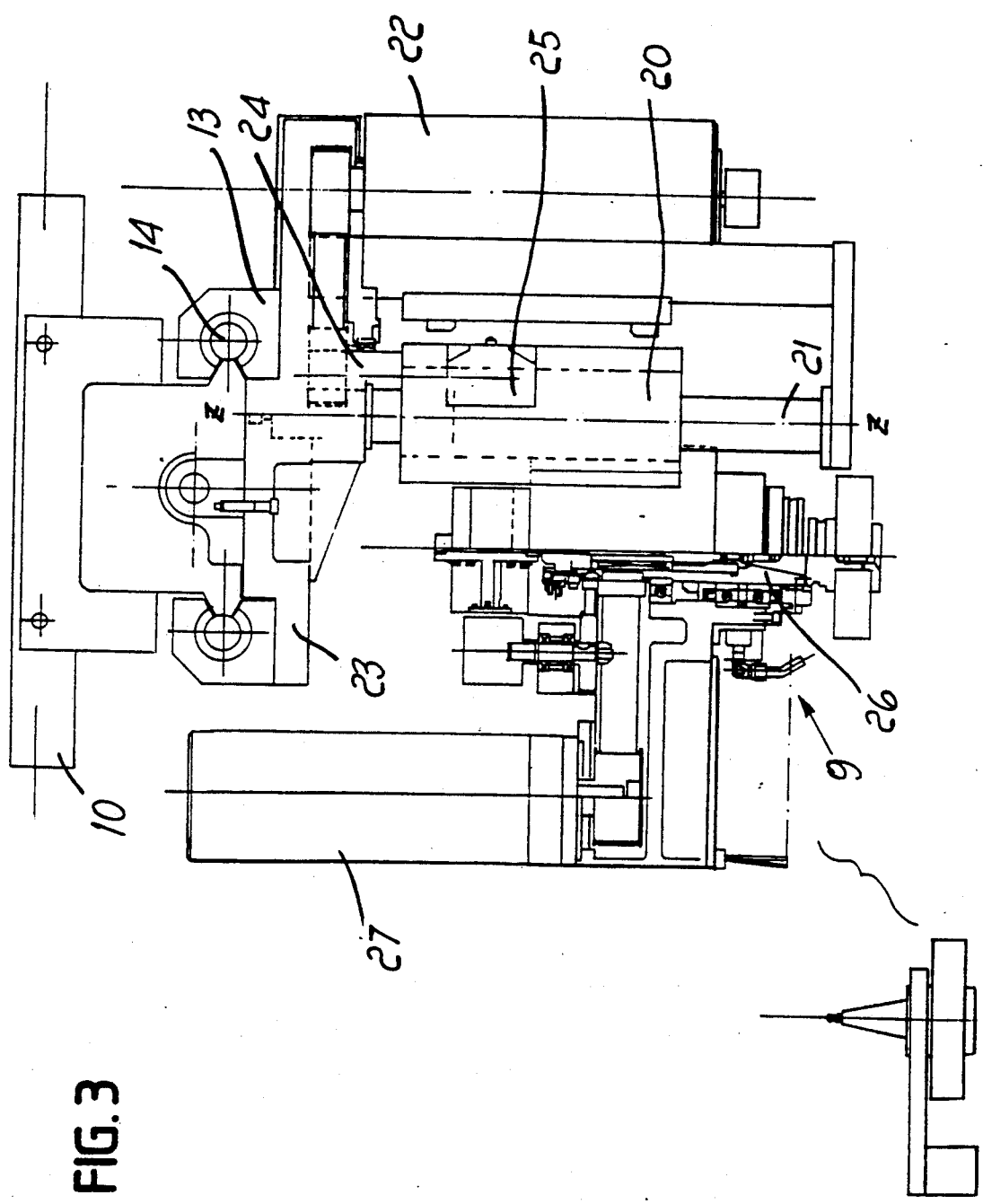
FIG. 3 is a sectional enlarged-scale view of a detail of the apparatus of FIG. 1.

The apparatus 1 is intended to follow the contour of a glass plate 2 which has the shape of a figure-of-eight in the example illustrated in FIG. 4.

A contour comprising straight portions and curved portions with a blended contour, in that the tangents of the curved portions are blended to the straight portions, can be executed on the plate 2.

The apparatus 1 comprises a frame which extends longitudinally in a direction X—X and has a horizontal table 3 and a sort of longitudinal portal which extends upward like a bridge along the table and above it.

Said portal has vertical uprights 4, 5 and a horizontal cross-member 6.

A horizontal surface 7 is fixed onto the table 3 and is intended to receive the glass 2 so that it rests thereon and is arranged horizontally on appropriate supports 8 which can be arranged so as to allow the machining of the contour of the plate: said supports ar of the type constituted by suckers associated with a suction unit, and retracting pneumatic abutments are also provided, constituted by cylinder type elements with a vertical axis, which are slidingly connected to the table and are actuated in a extraction direction to center the plate to be machined and are then actuated into a retracted position during the plate machining steps.

The apparatus 1 furthermore comprises a tool supporting head 9 which is supported by the frame in a manner described hereinafter.

A carriage 10 is mounted along the cross-member 6 of the frame so that it can slide along appropriate guides 11 connected to the cross-member 6.

Said carriage 10 can be moved in the direction X—X under the action of per se conventional carriage actuation means 12, constituted for example by a direct-current motor which actuates a ball bearing nut rigidly associated with the carriage.

A truck 13 is mounted below the carriage 10 and can slide with respect to the carriage along appropriate guides 14 which extend in a direction Y—Y which is orthogonal to the direction X—X.

Said truck 13 can move in the direction Y—Y under the action of per se conventional truck actuation means, for example a direct-current motor.

A slider 20 is mounted on the truck 13 and can slide along vertical guides 21 in the direction Z—Z.

Said slider 20 can move in the direction Z—Z under the action of actuation means which comprise a direct-current electric motor 22 which is mounted on a platform 23 associated with the truck 13, the shaft whereof rotates, by means of a toothed-belt transmission, a vertical screw 24 the thread whereof engages a ball bearing nut 25 which is rigidly associated with the slider.

The tool supporting head 9 is fixed to the slider 20 and comprises a grinder support mandrel 26 which can accommodate diamondized polishing grinders or a probe head for self-learning, as described hereinafter.

The mandrel 26 is actuated so as to rotate as required by an electric motor 27 which is mounted on the slider 20. The grinders are chosen so that they are suitable for performing, in succession, the roughing, finishing and polishing operations.

The apparatus is furthermore provided with means for sprinkling water at the grinding area, such means being of a generally known type.

A magazine 28 for the automatic changing of the tools and the loading of the probe is provided on a short side of the apparatus; in the particular case, there is a magazine for five tools plus a self-learning probe 29, but the number of tools might be different.

The tools are locked in the seat of the mandrel by means of known devices, advantageously by means of spiral springs which act on a double-action linear pneumatic actuation device in which the pressurized air is used to release the tool.

The self-learning probe 29 is advantageously of the type suitable for detecting the three dimensions X, Y and Z and for transmitting the coordinates with infrared-ray pulses; said probe allows to detect the position of the part and thus to define the placement of the tool at the optimum grinding level, and also allows the sensing, placement and machining of any geometrical contour. The infrared-ray transmission of the pulses avoids the presence of transmission cables which would hinder movements.

The detection of the level Z occurs by lowering the probe onto the plate; by means of this lowering, the level of the upper surface of the plate is detected, and the thickness of the plate is determined b subtracting the level at which the suckers act.

The apparatus according to the invention furthermore comprises a per se conventional numeric control device 30 adapted for receiving the coordinates of the contour of the plate 2. The input of coordinates of simple contours to the numeric control device 30 can be carried out manually by means of a keyboard 100. In the case of complex contours, the probe 29 transmits the coordinates of the edge of the plate to an infrared-ray pulse receiving means 101 associated with the conventional numeric control device 30.

The numeric control device is connected by means of cables to the means for actuating the carriage 10 and to the means for actuating the truck 13 in order to move the head 9 in the directions X—X and Y—Y with continuous contour processing control.

Advantageously, the numeric control device is also connected to the means which actuate the slider 20 in order to move the head 9 vertically toward and away from the glass to be contoured, as well as to the other motor means for an appropriate control of all the movements of the apparatus and for tool changing in automatic sequence according to the requirements.

Figures 5, 6:
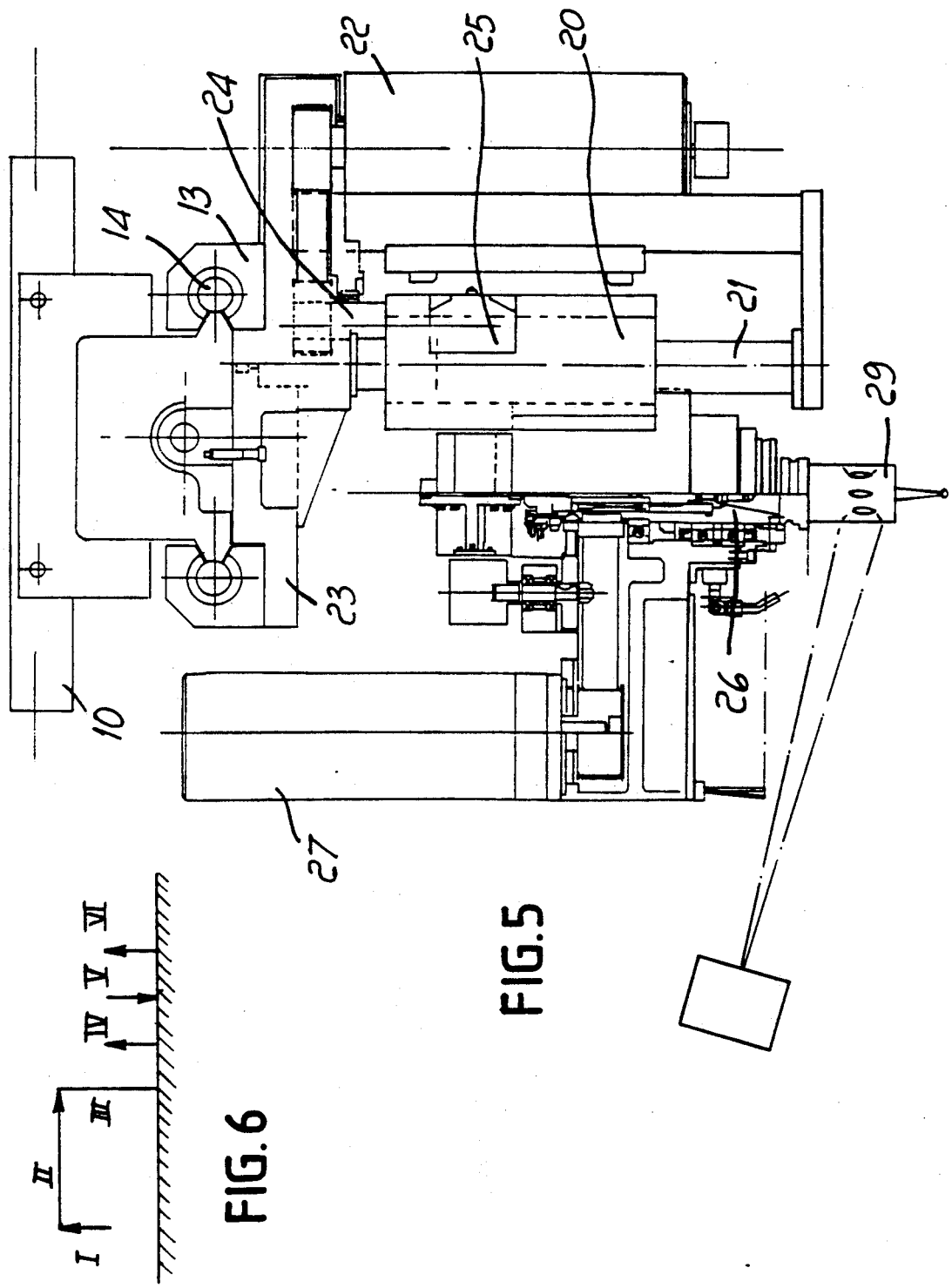
FIG. 5 is a view of the mounting of the self-learning probe.
FIG. 6 is a schematic view of the sequence of the self-learning movements.

Each of the sequences of self-learning movements is shown in FIG. 6, and consists of a first large and fast movement I away from the plate L, of a second large and fast movement II in a direction which is orthogonal to the first movement, of a third large and fast movement III for approximate approach to the part until abutment therewith occurs, of a fourth small and rapid backoff movement IV, of a fifth slow movement V for precise approach to the part, and of a sixth small and slow movement VI, at the end of which the pulses related to the sensed coordinates X and Y are transmitted to the computer.

If the plate is encountered during the second movement, or if the plate is not detected during the third movement, these events indicate a change in the direction of the plate with respect to the preceding sequences; in this case the directions and orientations of the movement of the head are rotated through 90 degrees.

For the machining of a glass plate having straight contour portions blended with curved portions, provisions are made so that the straight contour portions extend preferably along the axes X or Y, and in this manner the machining of these portions is performed by moving the grinder only along the direction of the axis X or only along the direction of the axis Y, whereas for the execution of the curved portions or also of the straight inclined portions the grinder is actuated with simultaneous X and Y movements such as to reproduce the required shape.

The contour of the plate is followed in succession with increasingly finer grinders, indeed in order to perform first roughing, then finishing and finally polishing.

Advantageously, the grinder is arranged halfway along the thickness of the glass plate, and the glass plate is equally touched by the probe halfway along its thickness in order to sense its contour.

The polishing grinders are subject to rapid wear, i.e. to rapid variations of their diameter and therefore of their machining contour: the apparatus automatically compensates this wear by moving the grinder axis toward the part being machined according to the power absorbed by the electric motor 27; when a decrease in absorbed power is detected, indicating that the grinder presses less against the plate since it has a smaller diameter, the path of the grinder axis is moved closer to the plate contour: the rpm rate of the motor is simultaneously changed in order to keep the set cutting speed constant.

The main advantage of the apparatus according to the invention resides in the fact that it allows to machine contours on glass plates in a fully automatic manner, with a single positioning of the plate to be machined.

Another advantage resides in the fact that the machined contours have unexceptionable and constant quality.

It is also possible to achieve a high production rate and a practically complete elimination of breakages or rejects.

Finally, the apparatus according to the invention allows to machine complex contours with variable curvatures along said contour also by virtue of the self-learning device, with a reduction in the downtimes for apparatus setup.

It has thus been observed that the invention achieves the proposed aim.

The invention thus conceived is susceptible to numerous modifications and variations, all of which are within the scope of the inventive concept. All the details may furthermore be replaced with other technically equivalent ones.

In practice, the materials employed, as well as the shapes and dimensions, may be any according to the requirements without thereby abandoning the scope of the protection of the following claims.

We claim:
1. Process for the automatic machining of an edge of a glass plate, comprising the steps of:
   fixing the glass plate onto a work table;
   storing a set of space coordinates along two orthogonal axes X and Y of the edge of the plate to be machined, said coordinates being detected by making successive sequences of self-learning movements of a probe along the edge of the plate;
   processing said coordinates in order to determine the path to be followed by the contour of a grinder in order to produce a contour which is constituted by arcs and straight lines tangent thereto;
   calculating the successive movements along the axes X and Y which the center of the grinder must perform in order to machine the edge of the plate according to at least one parameter selected from among;
   a) the diameter of the grinder being used, and;
   b) the wear of the grinder being used;
   controlling, by means of said calculated values, the movements of a grinder-supporting machining head along the edge of the plate;
   actuating said head so as to remove in succession, from a tool magazine, at least one tool selected from among;
   c) said self-learning probe, and;
   d) increasingly finer diamondized polishing grinders,
   whereby to produce, by means of successive passes, a polished edge on the edge of the plate,
   wherein the sequence of self-learning movements comprises a first large and fast movement away from the plate, a second large and fast movement in a direction which is orthogonal to the first movement, a third large and fast movement for approximate approach to the part until abutment therewith occurs, a fourth small and rapid backoff movement, a fifth slow movement for precise approach to the part, and a sixth small and slow movement, abutment with the plate during the second movement or lack of abutment during the third movement events indicating a change in the direction of the plate with respect to the preceding sequences, the directions and orientations of motion being in this case rotated through 90 degrees.

2. Apparatus for the automatic machining of an edge of a glass plate, comprising a substantially horizontal work table provided with fixing and centering means for at least one glass plate and on which a beam is fixed, a carriage being actuated along said beam so s to be movable along two axes X, Y which correspond to the directions of the length and width of said table, said carriage bearing vertical guides along which a slider is mounted and is actuated so as to be able to move vertically along an axis Z, said slider bearing a machining tool supporting head, said machining head comprising a grinder supporting mandrel with a vertical axis, a tool magazine for a plurality of grinders and for a probe, said apparatus further comprising a numeric control device for storing coordinates of the contour of the edge of the plate to be machined and for controlling movements of the tool supporting head in order to detect the contour with the probe and to actuate the grinding of the edge with increasingly finer grinder,
   wherein said probe transmits the detected coordinates by means of infrared-ray pulses, and wherein said numeric control device has connected thereto means for receiving said infrared-ray pulses transmitted by said probe.

3. Edge machining apparatus for glass plates comprising;
   a substantially horizontal work table;
   vertical uprights extending upwards from said table;
   a horizontal cross member supported by said uprights above said table;
   means for fixing and centering at least one glass plate provided on said work table;
   a tool supporting head;
   means for movably supporting said tool supporting head on said horizontal cross member for movement in three planes;
   a magazine having a plurality of tools, said plurality of tools comprising a plurality of grinders for roughing, finishing and polishing operations and a self-learning probe, at least one of said tools being locked to said tool supporting head, said magazine having means for automatically changing said at least one of said tools locked to said tool supporting head;
   numeric control device connected to said carriage actuation means, to said truck actuation means and to said slider actuation means, and;
   means for transmitting signals indicative of coordinates from said self-learning probe to said tool supporting head.

4. Edge machining apparatus according to claim 3, wherein said means for movably supporting said tool supporting head on said horizontal cross member for movement in three planes comprise;
   guide means connected to said cross member;
   a carriage slideably connected to said guide means;
   carriage actuation means for moving said carriage along a horizontal X—X axis;
   truck guides connected to said carriage;
   a truck slideably connected to said truck guides;

truck actuation means for moving said truck along a horizontal Y—Y axis, said Y—Y axis being perpendicular with respect to said X—X axis;

vertical guides connected to said truck;

a slider slideably connected to said vertical guides, and;

slider actuation means for moving said slider along a vertical Z—Z axis, said Z—Z axis being perpendicular with respect to said X—X axis and said Y—Y axis.

5. Edge machining apparatus according to claim 4, wherein said tool supporting head is fixed to said slider and comprises;

a grinder support mandrel, and;

mandrel actuation means.

6. Edge machining apparatus according to claim 3, further comprising keyboard means connected to said numeric control device for permitting direct manual input of simple contour configurations.

7. Edge machining apparatus according to claim 3, wherein said means for transmitting signals indicative of coordinates from said self-learning probe to said tool supporting head comprise;

means for transmitting detected coordinates by means of infrared-ray pulses connected to said probe; and means for receiving said infrared-ray pulses transmitted by said probe connected to said numeric control device.

8. Edge machining apparatus according to claim 3, further comprising means for automatically compensating for wear of said plurality of grinders for roughing, finishing and polishing operations.

9. Edge machining apparatus according to claim 8, wherein said mandrel actuation means comprise a mandrel actuation motor, and wherein said means for automatically compensating for wear of said plurality of grinders comprise means for detecting power absorbed by said mandrel actuation motor.

10. Edge machining apparatus according to claim 8, wherein said mandrel actuation means comprise a mandrel actuation motor, and wherein said means for automatically compensating for wear of said plurality of grinders comprise means for increasing speed of said mandrel actuating motor upon wear of said plurality of grinders, whereby to maintain constant cutting speed.

11. Edge machining apparatus for glass plates comprising;

a substantially horizontal work table;

vertical uprights extending upwards from said table;

a horizontal cross member supported by said uprights above said table;

means for fixing and centering at least one glass plate provided on said work table;

a tool supporting head having a grinder support mandrel;

mandrel actuation means;

means for movably supporting said tool supporting head on said horizontal cross member for movement in three planes;

a magazine having a plurality of tools, said plurality of tools comprising a plurality of grinders for roughing, finishing and polishing operations and a self-learning probe, at least one of said tools being locked to said tool supporting head, said magazine having means for automatically changing said at least one of said tools locked to said tool supporting head;

a numeric control device connected to said carriage actuation means, to said truck actuation means and to said slider actuation means, and;

means for transmitting signals indicative of coordinates from said self-learning probe to said tool supporting head, wherein said means for movably supporting said tool supporting head on said horizontal cross member for movement in three planes comprise;

guide means connected to said cross member;

a carriage slideably connected to said guide means;

carriage actuation means for moving said carriage along a horizontal X—X axis;

truck guides connected to said carriage;

a truck slideably connected to said truck guides;

truck actuation means for moving said truck along a horizontal Y—Y axis, said Y—Y axis being perpendicular with respect to said X—X axis;

vertical guides connected to said truck;

a slider slideably connected to said vertical guides, and;

slider actuation means for moving said slider along a vertical Z—Z axis, said Z—Z axis being perpendicular with respect to said X—X axis and said Y—Y axis.

12. Edge machining apparatus according to claim 11, further comprising keyboard means connected to said numeric control device for permitting direct manual input of simple contour configurations.

13. Edge machining apparatus according to claim 11, wherein said means for transmitting signals indicative of coordinates from said self-learning probe to said tool supporting head comprise;

means for transmitting detected coordinates by means of infrared-ray pulses connected to said probe; and means for receiving said infrared-ray pulses transmitted by said probe connected to said numeric control device.

14. Edge machining apparatus according to claim 11, further comprising means for automatically compensating for wear of said plurality of grinders for roughing, finishing and polishing operations.

15. Edge machining apparatus according to claim 14, wherein said mandrel actuation means comprise a mandrel actuation motor, and wherein said means for automatically compensating for wear of said plurality of grinders comprise means for detecting power absorbed by said mandrel actuation motor.

16. Edge machining apparatus according to claim 14, wherein said mandrel actuation means comprise a mandrel actuation motor, and wherein said means for automatically compensating for wear of said plurality of grinders comprise means for increasing speed of said mandrel actuating motor upon wear of said plurality of grinders, whereby to maintain constant cutting speed.

* * * * *